Sept. 25, 1962 G. BUDNICK 3,056,029

DEVICE FOR THE LINEAR INTERPOLATION OF FINE DIVISIONS

Filed Feb. 17, 1959

2 Sheets-Sheet 1

GÜNTHER BUDNICK
INVENTOR.

BY Cushman, Darby & Cushman
ATTORNEYS

Sept. 25, 1962 G. BUDNICK 3,056,029

DEVICE FOR THE LINEAR INTERPOLATION OF FINE DIVISIONS

Filed Feb. 17, 1959

2 Sheets-Sheet 2

GÜNTHER BUDNICK
INVENTOR.

BY Cushman, Darby & Cushman
ATTORNEYS

United States Patent Office 3,056,029
Patented Sept. 25, 1962

3,056,029
DEVICE FOR THE LINEAR INTERPOLATION OF FINE DIVISIONS

Günther Budnick, Darmstadt, Germany; Thea Budnick, heir and legal representative of minor children of said Günther Budnick, deceased Filed Feb. 17, 1959, Ser. No. 793,841
Claims priority, application Germany Feb. 24, 1958
16 Claims. (Cl. 250—208)

According to the prior art it is already known to subdivide the divisions e.g. in the case of machine tools, in the electrical way by means of a linear interpolation. In some cases phase-shifted pulse pick-up devices have already been provided to this end. The present invention is in particular concerned with improvements in or relating to the conventional method.

According to the invention the division may be designed as an indexing grating cooperating with an oblique-positioned scanning grating; the thereby resulting moiré fringe patterns being scanned by at least two photoelectric cells arranged in a phase-shifted manner. According to another feature of the invention the linear interpolation may be carried out with respect to time with the aid of electronic measuring means. In accordance with the invention this is accomplished in that there is provided such a fine division that the deviation resulting from indexing interval to indexing interval in the case of speed variations will remain so small that the next successive indexing or graduation line will be lying within the desired or admissible indexing tolerance. In this case electronic means will then have to be provided for linearly inserting intermediate values between the values as given by the indexing lines of the division.

In the following the inventive methods are referred to as linear interpolation methods.

Some exemplified embodiments of the invention are schematically shown in FIGS. 1–13 of the accompanying drawings, in which.

Figure 1:
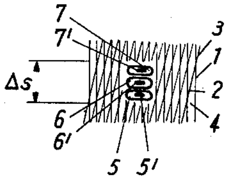
FIG. 1 shows the formation of crossing lines with the aid of two gratings or moiré fringe patterns, as well as the scanning thereof with the aid of photoelectric cells.

The scanning grating 2 in FIG. 1 is disposed at a slight distance in front of the actual optical diffraction grating 1, and is held at a small angle in relation thereto. When the arrangement or system is transilluminated by a parallel light then there will result the well-known moiré fringe pattern (crossing lines) e.g. 3 and 4, moving vertically in relation to the movement of the optical diffraction grating 1 (see VDI-Forschungsheft 470, issue B, vol. 24, 1958 (VDI-Verlag G.m.b.H., Dusseldorf), page 40, FIGS. 54–57 and the correlated text). Their distance $\Delta s$ depends on the angle of slope of the two diffraction gratings. This distance can be adjusted to become so large that more than one photocell can be employed (in the drawing it is shown that three of them, i.e. 5, 6 and 7 are provided). For space-saving reasons it is of advantage to employ modern photodiodes (phototransistors). Upon performance of one movement the crossing line 3 will successively cover up the light-sensitive surface areas of the photodiodes (phototransistors) 5′, 6′ and 7′. Each of the diodes (transistors) is capable of producing one electric pulse with the aid of a pulse shaper. Thus, in the present example, three pulses have been produced per crossing line, in other words, the graduation or indexing scale has become trebled, i.e. the indexing interval has been reduced to one-third. In order to obtain defined pulses, the indexing line is supposed to be so small with respect to the indexing interval that the crossing line will become narrower than the distance between two photodiodes (phototransistors). In this way one crossing line will always be capable of controlling one photodiode (phototransistor) only. In practice it has proved that in this way about 10 pulses can be produced per indexing interval. The thus obtained pulses may be used for the counting or controlling purpose respectively. When connecting the outputs of the photocells in parallel there will then be obtained a successive train of the pulses upon movement of the indexing line.

As mentioned hereinbefore, another important type of embodiment of the invention consists in that by one indexing line of the division there is triggered or excited a pulse generator for producing a number of pulses within the interval. These pulses then serve as a subdivision of the original division. In order to describe one example of practical application reference is made to measurements carried out on machine tools. Such measurements have proved that the speed variations of high-precision machine tools remain below one percent. According to this, the greatest motional deviation or travel error would amount to one percent of the indexing interval. When considering that this motional or travel deviation in the utmost corresponds to one-half of the sub-intervals produced by the multiplication it will be seen that one indexing interval of the division may be divided into a maximum of 50 sub-intervals only.

Figure 2:
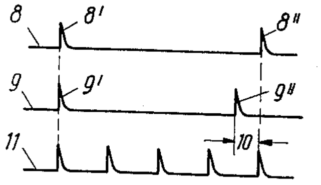
FIG. 2 shows the schematic representation of a linear pulse interpolation.

The corresponding processes will be better understood from the showing of FIG. 2. There is first of all shown an ideal train of pulses 8 comprising the pulses 8′ and 8″ obtained during a faultless or deviation-free movement or travel of the machine tool from the scanning of a division. On this there depends the interpolation, which is assumed to effect an indexing of the pulse intervals into four parts. This is indicated by the pulse train or sequence 11. By the actual movement there is delivered the pulse train 9. On account of a motional variation the pulse 9″ appears too early by the amount 10. The interpolation may be applied whenever this deviation 10 remains smaller than the desired or admissible indexing tolerance, which may be achieved in all cases by suitably dimensioning the interval between the pulses 9′ and 9″. However, the interval between the pulses 9′ and 9″ corresponds to the distance between two indexing lines of the original division. Therefore, if the speed variation becomes greater, this original division has to be made finer. This is a substantial recognition, at the same time also indicating the limits of the interpolation method.

For producing the pulses serving the limitation of the sub-intervals there exist various well-known possibilities.

One such possibility consists in employing the frequency multiplication method. The pulses as derived from the moved division are distorted and from the thus obtained spectrum there is filtered out a suitable harmonic. The frequency of this harmonic wave is decisive for the sub-wave. (See VDI-Forschungsheft No. 470, chapter 8.3 on page 43 "Messung von Impulsabständen.")

Figure 3:
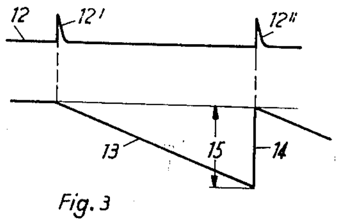
FIG. 3 shows the release of an interpolating sawtooth voltage by means of a pulse control.
Figure 4:
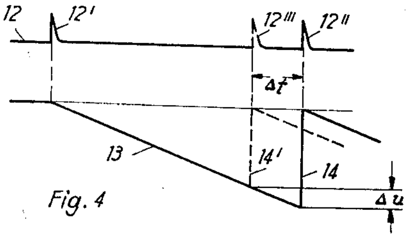
FIG. 4 shows the measuring of a pulse interval by means of a pulse-controlled sawtooth voltage.

Besides the frequency multiplication method there still exists a further interpolation possibility in a sawtooth voltage which is started by a first pulse and is terminated and re-started by the second pulse. During this time interval the peak of the sawtooth reaches a predetermined voltage level which is supposed to be known and, either manually or automatically, is brought to a predetermined value by varying the increase of the voltage rise. According to the showing of FIG. 3 the sawtooth 13 is controlled by the train of pulses (or pulse sequence) 12, wherein the pulse 12' determines the beginning, and the pulse 12'' the end of the pulse train 14. The finally, reached voltage amplitude or height 15 is determined by the rise of the sawtooth and the time interval between the pulses. A variation of the time interval by the amount $\Delta t$, which is oppositely in proportion with a speed deviation of the corresponding division, i.e. a pulse displacement from 12'' to 12''' (FIG. 4), will deliver a new trailing edge 14' and, consequently, a peak voltage varied by the amount $\Delta u$. This arrangement may be employed in an exceptionally successful manner for measuring smallest speed variations.

Sawtooth voltages can be easily produced with the aid of conventional means in a very exact manner. As particularly suitable to this end there has proved a so-called phantastron circuit in which both the commencement and the termination of the sawtooth can be controlled in a simple way e.g. via the free suppressor grid of the employed pentode, and in which the voltage rise can be varied by correspondingly adjusting a direct voltage or the decisive circuit elements. Such types of circuit arrangements are described in the book entitled "Waveforms," one of the Radiation Laboratory Series, McGraw-Hill Book Company Inc., New York, 1949, on pages 195–204 under the heading "Phantastron Type Schemes."

Figure 5:
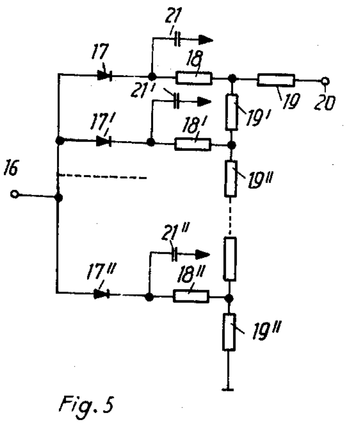
FIG. 5 shows the exemplified embodiment of an interpolation circuit (responsive to voltage)

According to the invention the thus obtained sawtooth voltage is now compared with one or more fixed voltages, upon exceeding of which there is each time released an impulse. Circuit arrangements suitable to this end are described in chapter 9 of the above cited book "Waveforms." An exemplified type of embodiment is shown in FIG. 5 of the copending drawings. To the point 16 there is applied the sawtooth voltage assumed to have the value of 100 volts. A fixed voltage of 100 volts is assumed to be applied to point 20, whereby the latter is assumed to be divided into 50 parts by resistors 19, 19', 19'' through 19$^n$, the respective interval or leap being assumed to equally have the value of 2 volts. If now the sawtooth voltage commences at 0 volt and extends towards 100 volts then first of all at the value of 2 volts the diode 17 will become conductive and will draw the current across a resistor 18. The voltage drop as produced across this resistor is tapped via a capacitor 21 of a small time-constant, in the form of a short pulse. The sawtooth voltage successively sweeps over all diodes 17' through 17$^n$, correspondingly a current will flow successively across the resistors 18' through 18$^n$, so that finally 50 pulses will have been produced at the capacitors 21' through 21$^n$, in other words, until finally the indexing interval is interpolated into 50 parts.

Besides, for the adaptation to the indexing interval, also the variable or quantity of the reference voltage at the switching point 20 may be adjusted correspondingly.

Figure 6:
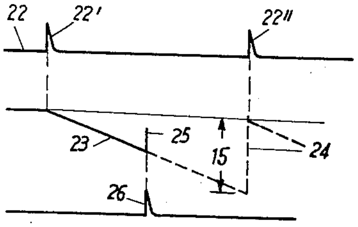
FIG. 6 is a schematic representation relating to the measurement of the relative position of two trains of pulses.

However, in many cases of practical application the knowledge concerning all of these values, that is, of all of these sub-intervals is not required or necessary. Often it will be sufficient to determine the position of a separate or foreign pulse, e.g. of a synchronizing pulse between two indexing lines. As will be seen from the showing of FIG. 6 the voltage sawtooth 23, which is controlled by the train of pulses 22 with the pulses 22' and 22'', may either be stopped by the separate pulse 26 so that the trailing edge 24 is advanced to 25, or the value of the sawtooth 25, existing at the instant of the separate pulse, is connected via an electronic switch to a storage device in which this value will be stored. In relation to the total voltage of the sawtooth 15 this voltage value is a measurement for the relative position of the separate or foreign pulse. By the setting of the scale for the interpolation there is fixed or formulated the value of the total voltage.

Figure 7:
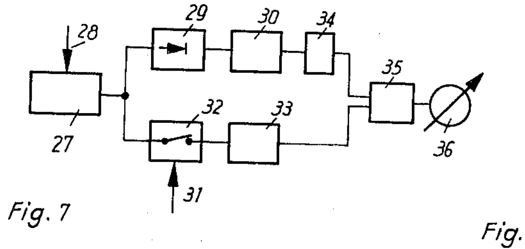
FIG. 7 is the schematic representation of a difference measurement serving the determination of a pulse position.

In other cases of practical application there does not interest the exact absolute position of the separate pulse but, especially for regulating purposes, the deviation from a desired or rated value. In this case there may be successively used a difference method in which an adaptation of the rise of the sawtooth interval is superfluous within wide limits. Such a structure is shown by way of example by the type of embodiment in FIG. 7. The pulse sequence 28 as produced by the one movement controls the sawtooth generator 27. The maximum voltage thereof, which is attained during one interval, is ascertained via a point-contact rectifier 29 and is retained by the storage 30 for the period of one further interval. The nominal value of the position of separate pulses, e.g. of the synchronizing pulse 31, is obtained in the manner described hereinbefore. An electronic switch 32 is controlled by the pulses 31. The output of the electronic switch is fed to a subsequently arranged storage device 33, in which the value of voltage of the sawtooth, existing at the instant of the separate pulse, is stored for the period of time of a further interval. The rated value is adjusted or set at the voltage divider 34. As a rule the separate pulse will be supposed to be lying exactly between the pulses 28, so that the voltage divider 34 will have to exactly divide the voltage in half which is stored in the storage 30. Both the rated value and the nominal value are connected to a difference or differential amplifier 35 capable of indicating the relative deviation on an instrument 36, or whose output voltage or output current is capable of producing a control quantity, with the aid of which the pulse sequence and, consequently, the movement 28 or 31 respectively, can be controlled in such a way that the difference between the rated and the nominal value will proceed towards zero.

Figure 8:
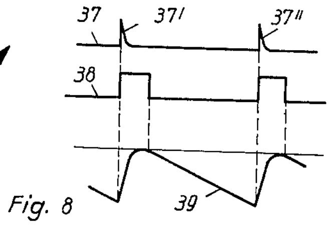
FIG. 8 is the schematic representation of the delayed initiation of the controlled sawtooth voltage.

However, practically every sawtooth voltage has no infinitely short return time. For eliminating this inaccuracy it is proposed by the invention according to FIG. 8 to insert between the control pulses of the pulse train 37, i.e. the pulses 37', 37'' and the actual release of the sawtooth 39, a delay pulse 38. This time-delay pulse 38 has a constant width or duration, or else a width automatically adapted to the width of the interval, of about 10–20 percent. The trailing edge of this pulse initiates the sawtooth which has been meanwhile restored to the output voltage.

Figure 9:
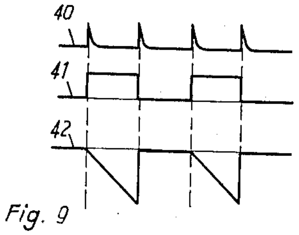
FIG. 9 is the schematic pulse diagram of a controlled sawtooth voltage with a pulse indexing.

In accordance with FIG. 9 there may also be introduced a pulse division, in that one complete interval width is put at the disposal of the return sweep. The train of pulses 40 alternately effects the switching-on and -off of a rectangular voltage 41. The sawtooth 42 will only run when the rectangular voltage is switched on, and is stopped upon disconnection thereof. This arrangement is more simple than the one according to FIG. 8, but of course, half the information of the pulse train 40 goes astray therewith.

Figure 10:
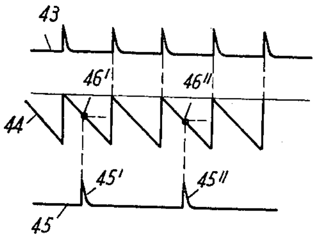
FIG. 10 is the schematic pulse diagram relating to an interpolation in the case of integer pulse-frequency conditions.

FIG. 10 shows that when employing a sawtooth interpolation, the frequency of both the train of control pulses 43 and the train of separate pulses 45 with the pulses 45' and 45'' may have any integer relationship, hence is not restricted to a 1:1 relationship. Merely the storage time of the storages (e.g. 33, FIG. 7), retaining the instantaneous values of the sawtooth voltage (values e.g. at 46' and 46'') is to be extended. Appropriately the storages are directly controlled by the pulses 45. This is of importance e.g. in the presence of differently wide divisions or different speed conditions respectively, which have to be synchronized with one another.

Figure 11:
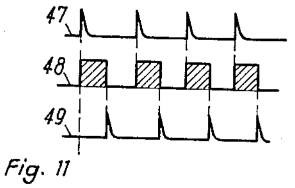
FIG. 11 is the schematic pulse diagram relating to a linear interpolation by way of forming an integral.

The possibility of a further linear interpolation resides, according to the invention, in a rectangular pulse generation with a subsequently following integration. According to FIG. 11 rectangular pulses 48 are formed by the pulse sequence 47. If these rectangular pulses extend over the entire width of the interval then the value of the integral will reach a certain magnitude, while the integral will be correspondingly smaller if the pulses are shorter. By the train of pulses 47 there is only controlled the leading edge of the rectangular pulses 48, while the trailing edge is determined by the pulse sequence 49 to be compared, as can be easily accomplished by means of conventional arrangements, such as bistable multivibrators. Such types of multivibrators are described by way of example in chapter 5.4 on page 164 of the above cited book "Waveforms." These pulses are then integrated and will deliver the nominal value of the relative pulse position between the pulse sequences 47 and 49. This nominal value is then compared with the rated value which, in turn, is a fraction of the integral value resulting with respect to the full length or duration of the interval.

Figure 12:
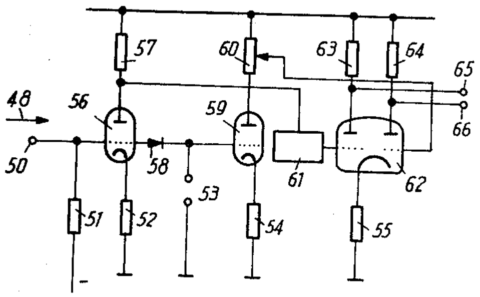
FIG. 12 shows an exemplified circuit arrangement for carrying out the linear interpolation by way of forming an integral.

In FIG. 12 there is shown a particularly advantageous circuit arrangement for carrying out the linear interpolation by employing the generation of rectangular pulses. In this arrangement the sequence of rectangular pulses 48 is applied to the grid 50 of the tube 56. Normally the tube is blocked or rendered inoperative via the resistance 51. However, by the pulse the inoperative condition is eliminated during the period of time of this pulse (pulse duration). The grid voltage is limited by the diode 58 connected to a fixed reference potential 53, the tube, therefore, together with the cathode resistance 52, acts as a constant-current tube, so that the voltage drop produced across the resistance 57 will become extensively independent of the tube properties. The thus obtained voltage is fed via an integrating circuit 61 to the lefthand grid of the tube 62, operating together with the resistor 55, 63 and 64 as a differential amplifier, as the nominal value, while the rated value is obtained with the aid of a tube 59, which in analogy with the tube 56, but continuously, produces a constant current across the resistor 54, and the voltage divider 60, and is fed to the righthand grid of tube 62. Between the anodes of this tube, at the points 65 and 66, there may be tapped or taken off a voltage which is in proportion with the deviation of the nominal and the rated value.

Figure 13:
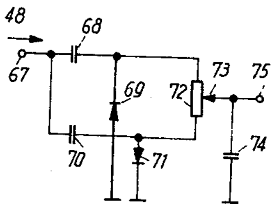
FIG. 13 shows an exemplified circuit arrangement for carrying out the linear interpolation by means of both the formation of an integral and a difference measurement.

In FIG. 13 there is shown a further circuit arrangement by which the switch-on duration is compared with the switch-off duration of the pulses 48. These are applied to point 67 of the circuit. The capacitor 68 and the diode 69 together form a rectifier for the switch-on duration, while a corresponding one for the switch-off duration is constituted by the elements 70 and 71. The combination of the diode 69 and the capacitor 68 therefore is a rectifier providing the integral of the current versus time curve, in other words, indicating the quantity of current. The obtained voltage values are connected oppositely to one another across the resistor 72. This resistor, by its tapping 73, is brought into the desired rated relationship, that is, the tapping has to be in the middle or center whenever the switch-on duration is supposed to be equal to the switch-off duration. If the rated value deviates from the nominal value then a corresponding differential voltage will appear at the switching point 75 and is then smoothed by the capacitor 74.

The voltages as tapped at the terminals 65 and 66 (FIG. 12) or at the switching point 75 (FIG. 13) respectively, may be used either for the indication or the readjustment of the nominal value.

The described methods relating to the linear interpolation are not only suitable for employment with optical divisions, that is, e.g. optical diffraction gratings for serving as the longitudinal divisions or divided circles, but may be analogously also applied to magnetic divisions with a magnetic scanning, divisions employing a standing supersonic wave and a piezo-electric scanning or, for example, to divisions with applied fringe-like coatings and a capacitive scanning, or employing a scanning with the aid of mechanical brushes. Furthermore, the linear interpolation method may be applied to divisions according to the well-known magnetic-tape, sound-film, or recording-disc methods.

The method of linear interpolation according to the present invention may be advantageously applied to the devices described in my copending patent application of even date filed with the same priority date and corresponding to the German patent application Ser. Nos. B 47 961 IX/42b and B 47 955 IX/42c.

What I claim is:

1. Means for obtaining a sequence of vernier electrical signals in response to a unit movement between two divisional optical gratings, one of which is angularly disposed with respect to the other whereby when the gratings are viewed in superimposed position, a given division on said other grating intersects adjacent divisions on said angularly disposed grating at points spaced apart on said given division by a predetermined distance, a source of light disposed on one side of said gratings whereby a separate light pattern is produced by said gratings in response to each unit of movement therebetween, each of separate and sequential electrical vernier signals equal along a given axis spaced from said gratings in timed relation, a plurality of light-sensitive devices disposed along said axis for producing for each pattern a series of separate and sequential electrical venier signals equal in number to the number of light-sensitive devices, the distance between the sensitive areas of the end light-sensitive devices disposed along said axis being less than said predetermined distance, and means coupled to said light-sensitive devices for providing a sequence of vernier signals corresponding to said separate and sequential signals at a single terminal.

2. An apparatus for producing a train of vernier electrical signals in response to a small unit of movement between two bodies, said apparatus comprising in combination means for producing light patterns having maxima passing adjacent points along a given axis in a given direction in timed relation in response to movement in a given direction between said bodies, means for producing a series of separate sequential electrical signals in response to maxima of a given pattern passing spaced points along said axis, and means for providing at a single terminal a signal train representing said separate sequential electrical signals.

3. Apparatus for producing vernier electrical signals in response to movement between two divisioned optical gratings, one of which is angularly disposed with respect to the other, said apparatus comprising in combination means for passing light through said gratings to produce a light pattern for each unit of movement between said gratings such that the distance between successive patterns passing a given point is less than a predetermined tolerance distance of movement, means for producing at least one electrical pattern index signal in response to each light pattern received at said given point spaced from said gratings, and means for producing at least one separate index signal in response to each pattern index signal timed in relation to said pattern index signal such that said separate index signal is produced timewise between successive pattern index signals.

4. Apparatus for producing vernier electrical signals in response to movement between two divisioned optical gratings as defined in claim 3 wherein said means for producing at least one separate index signal includes means for distorting each pattern index signal to produce a multiharmonic signal, and means for filtering from said multiharmonic signal a given harmonic thereof to provide said separate index signal.

5. Apparatus for producing vernier electrical signals in response to movement between two divisioned optical gratings as defined in claim 3 wherein said means for producing at least one separate index signal includes means for initiating a linearly increasing voltage with said pattern index signal, and means for generating said separate index signal in response to said increasing voltage exceeding a predetermined value.

6. Apparatus for producing vernier electrical signals in response to movement between two divisioned optical gratings as defined in claim 5 wherein said linearly increasing voltage is initiated by said pattern index signal after a time delay of less than the period between production of successive pattern index signals.

7. Apparatus for producing vernier electrical signals in response to movement between two divisioned optical gratings as defined in claim 5 wherein the rate at which said voltage increases is correlated with the timed relation between production of successive pattern index signals.

8. Apparatus for producing vernier electrical signals in response to movement between two divisioned optical gratings as defined in claim 5 wherein said separate index signal is only initiated if such a separate index signal has not been initiated by the preceding pattern index signal.

9. Apparatus for producing vernier electrical signals in response to movement between two divisioned optical gratings as defined in claim 3 wherein said means for producing at least one separate index signal includes means for initiating a linearly increasing voltage with said pattern index signal, and means for generating a plurality of separate index signals in response to said increasing voltage exceeding predetermined values.

10. Apparatus for producing vernier electrical signals in response to movement between two divisioned optical gratings as defined in claim 3 wherein said means for producing at least one separate index signal includes means for controlling the repetition rate of a sawtooth voltage wave with said pattern index signal, means for comparing the magnitude of said voltage wave with at least one fixed direct voltage, and means for generating said separate index pulse whenever the magnitude of said voltage wave exceeds said fixed direct voltage.

11. Apparatus for measuring variations in speed between two divisioned optical gratings, one of which has division lines angularly disposed with respect to the division lines of the other, said apparatus comprising in combination means for passing light through said gratings to produce a light pattern for each unit of movement between said gratings, means for producing at least one electrical pattern index signal in response to each light pattern received at a given point spaced from said gratings, means for controlling the duration of a linearly increasing voltage with said pattern index signal, and means for measuring the amount by which the peak voltage reached by said increasing voltage differs from a predetermined value to indicate variations in speed between said gratings.

12. Apparatus for determining the degree of relative movement between two divisioned optical gratings, one of which is angularly disposed with respect to the other, said apparatus comprising in combination means for passing light through said gratings to produce a light pattern for each unit of movement between said gratings, means for producing at least one electrical pattern index signal in response to each light pattern received at a given point spaced from said gratings, means for initiating a linearly increasing voltage with said pattern index signal, means for cutting off said linearly increasing voltage by means of a separate electrical signal occurring in predetermined timed relation to said pattern index signal and before a successive pattern index signal, and means for electrically measuring the peak magnitude reached by said linearly increasing voltage at the time of cut-off to indicate the degree of relative movement between such gratings.

13. Apparatus for determining the degree of relative movement between two divisioned optical gratings as defined in claim 12 wherein the ratio of the comparative frequency of the pattern index signal to the comparative frequency of the separate electrical signal is a whole number.

14. Apparatus for determining the degree of relative movement between two divisioned optical gratings, one of which is angularly disposed with respect to the other, said apparatus comprising in combination means for passing light through said gratings to produce a light pattern for each unit of movement between said gratings, means for producing at least one electrical pattern index signal in response to each light pattern received at a given point spaced from said gratings, means for initiating a linearly increasing voltage with said pattern index signal, means for cutting off said linearly increasing voltage by means of a separate electrical signal occurring in timed relation to said pattern index signal before a successive pattern index signal, and means for electrically measuring the peak magnitude reached by said linearly increasing voltage at the time of cut-off, providing a separate voltage having a magnitude at least proportional to the peak magnitude which said linearly increasing voltage would reach if not cut off by said separate signal, and means for electrically subtracting said separate voltage and at least a predetermined fraction of said linearly increasing voltage having said peak magnitude to provide a electrical signal having a magnitude corresponding to the degree of movement between said gratings.

15. Apparatus for determining the degree of relative movement between two divisioned optical gratings, one of which is angularly disposed with respect to the other, said apparatus comprising in combination means for passing light through said gratings to produce a light pattern for each unit of movement between said gratings, means for producing at least one electrical pattern index signal in response to each light pattern received at a given point spaced from said gratings, means for initiating a direct voltage signal with said pattern index signal, means for cutting off said direct voltage with a separate and reference electrical signal to provide a square wave pulse, means for integrating said square wave pulse to obtain an output voltage pulse correlated to the duration of said square wave pulse, and means for electrically comparing said output pulse with a preselected voltage to determine the degree of relative movement between said gratings.

16. Apparatus for determining the degree of relative movement between two divisioned optical gratings, one of which is angularly disposed with respect to the other, said apparatus comprising means for passing light through said gratings to produce a light pattern for each unit of movement between said gratings, means for producing at least one electrical pattern index signal in response to each light pattern received at a given point spaced from said gratings, means for initiating a direct voltage signal with said pattern index signal, means for cutting off said direct voltage with a separate and reference electrical signal to provide a square wave pulse, means for integrating said square wave pulse to obtain an output voltage pulse correlated to the duration of said square wave pulse, and means for electrically comparing said output pulse with a preselected voltage to determine the degree of relative movement between said gratings, electrically integrating the switch-on duration of said square wave pulse and the switch-off duration thereof to obtain two output pulses correlated to said durations, and electrically comparing said output pulses to provide an ultimate electrical signal having a magnitude indicative of the degree of relative movement between said gratings.

References Cited in the file of this patent

UNITED STATES PATENTS

| | | |
|---|---|---|
| 2,857,802 | Cail | Oct. 28, 1958 |
| 2,861,345 | Spencer | Nov. 25, 1958 |